TRANSMISSION SYSTEM FOR THE TRANSMISSION OF SIGNALS
COMPRISING OPERATIVE AND RESERVE APPARATUS

Filed Feb. 26, 1957

→ T

INVENTORS
WILLEM KOENRAAD HOFKER
JACOBUS PETRONELLA JOHANNES NABBEN
BY
Frank R. Jifari
Agent 2,885,567

TRANSMISSION SYSTEM FOR THE TRANSMISSION OF SIGNALS COMPRISING OPERATIVE AND RESERVE APPARATUS

Willem Koenraad Hofker and Jacobus Petronella Johannes Nabben, Hilversum, Netherlands, assignors to North American Philips Company, Inc., Irvington-on-Hudson, N.Y.

Application February 26, 1957, Serial No. 642,535

Claims priority, application Netherlands March 22, 1956

5 Claims. (Cl. 307—64)

This invention relates to a transmission system for the transmission of signals, for example telegraphy or telephony signals, comprising operative and reserve apparatus, a change-over arrangement and switching relays being associated with the operative and reserve apparatus, respectively, for changing over from the operative to the reserve apparatus under the control of the change-over arrangement.

In transmission systems, such as wireless and carrier-wave telephony systems and the like, such change-over arrangements can be used advantageously to improve the reliability since they permit an automatically changing over from the operative apparatus to the reserve apparatus on the occurrence of a fault. These change-over arrangements are particularly important for routine testing of the transmission system, since after switching over from the operative apparatus to the reserve apparatus, the operative apparatus can be measured and any deviations from the normal operating condition can be traced.

It is an object of the invention to provide, in transmission systems of the kind described in the preamble, a change-over arrangement by means of which, with the use of normal and consequently inexpensive relays, the interruption period due to changing-over can be reduced to a minimum, for example can be reduced to less than 1 or 2 msec. or even to zero.

The system in accordance with the invention is characterized in that the change-over arrangement contains two auxiliary relays which cut off one another and each comprises a make contact included in a circuit connected in parallel with the energizing winding of the other auxiliary relay and a rest contact included in a circuit connected in parallel with the energizing winding of the switching relay concerned, whereby in the working condition of either of the auxiliary relays the energizing winding of the other auxiliary relay is short-circuited by the closure of the make contact and in the rest position of either of the auxiliary relays the energizing winding of the switching relay concerned is short-circuited due to the closure of the rest contact, the energizing circuits of both auxiliary relays each containing a switch, in order to change over from the operating apparatus to the reserve apparatus, interrupts the energization of an energized auxiliary relay.

Due to the symmetrical structure of the change-over arrangement, the constructional advantage is obtained that each of the switching relays, together with the associated auxiliary relay, and the change-over switch, can be mounted as an integral structure together with the apparatus to be supervised.

Figure 1:
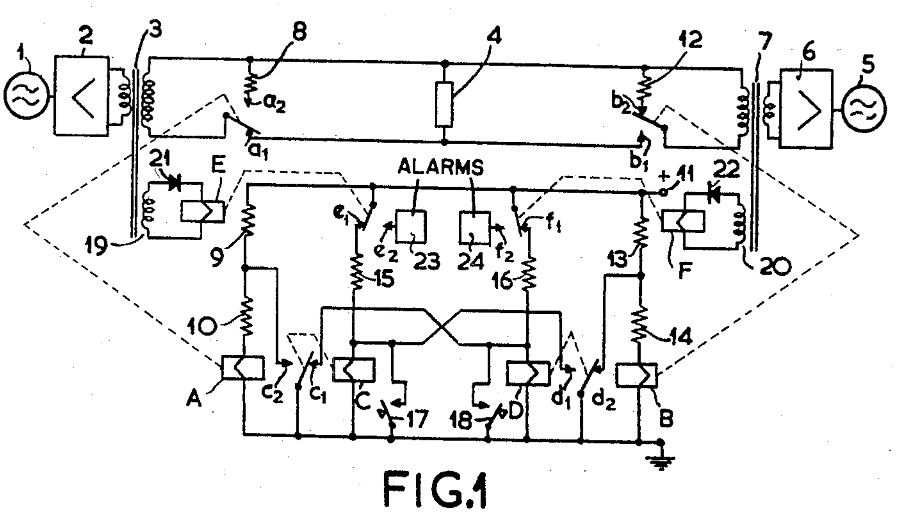
Figure 2:
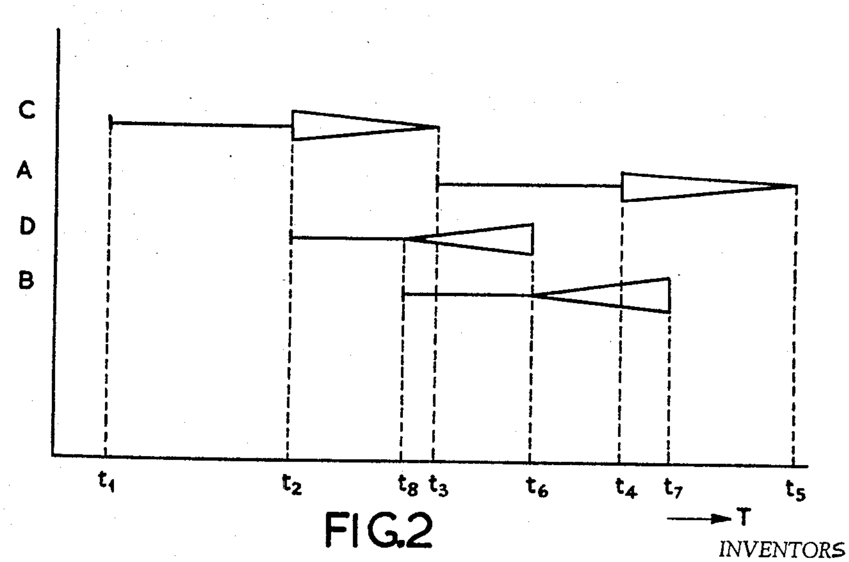

In order that the invention may readily be carried out, one embodiment thereof will now be described in detail, by way of example, with reference to the accompanying diagrammatic drawings, in which:

Fig. 1 shows a carrier-wave supply arrangement in a carrier-wave telephony system provided with a change-over arrangement in accordance with the invention, and Fig. 2 is a time diagram of the change-over arrangement shown in Fig. 1.

The carrier-wave supply arrangement of a carrier-wave telephony system shown in Fig. 1 contains a carrier-wave oscillator 1 which is connected, through a carrier-wave amplifier 2 having an output transformer 3, to an output load 4 and a reserve apparatus comprising a carrier-wave oscillator 5, a carrier-wave amplifier 6 and an output transformer 7.

This carrier-wave supply arrangement also contains a change-over arrangement for changing over from the operative apparatus 1, 2, 3 to the reserve apparatus 5, 6, 7 with the use of switching relays A and B associated with the operative apparatus 1, 2, 3 and the reserve apparatus 5, 6, 7, these switching realys effecting the change-over. The switching relay A has a make contact $a_1$ and a rest contact $a_2$ which are connected to the output load 4 and a load simulating impedance 8, respectively, the energizing winding being connected, through the series-connection of resistors 9 and 10, to the positive terminal 11 of a voltage supply source. Similarly, the switching relay B has a make contact $b_1$ and a rest contact $b_2$ which are connected to the output load 4 and a load simulating impedance 12, respectively, the energizing winding being connected, through the series-connection of resistors 13 and 14, to the positive terminal 11 of the voltage source.

In the condition shown of the carrier-wave supply arrangement, the carrier-wave oscillator 1 together with the carrier-wave amplifier 2 acting as the operative apparatus and the carrier-wave oscillator 5 together with the carrier-wave amplifier 6 forming the reserve, the switching relay A is energized and the switching relay B is not energized. The output voltage of the carrier-wave amplifier 2 is supplied, through the make contact $a_1$, to the output impedance 4 and the output voltage of the carrier-wave amplifier 6 is supplied, through the rest contact $b_2$, to the load simulating impedance 12. A change-over from the operating apparatus 1, 2, 3 to the reserve apparatus 5, 6, 7, so that the output voltage of the carrier-wave amplifier 6 is supplied to the output impedance 4 and the output voltage of the carrier-wave amplifier 2 is supplied to the load simulating impedance 8, is effected by controlling the energization of the two switching relays A and B by means of two auxiliary relays C and D. The energizing windings of the two auxiliary relays C and D are connected to the positive terminal 11 of the voltage supply source through resistors 15 and 16, respectively.

The auxiliary relay C has a make contact $c_1$, which is connected to the junction of the resistor 16 and the energizing winding of the auxiliary relay D and a rest contact $c_2$ which is connected to the junction of the series resistors 9 and 10 in the energizing circuit of the switching relay A. Similarly, the auxiliary relay D is provided with a make contact $d_1$ which is connected to the junction of the resistor 15 and the energizing winding of the auxiliary relay C and with a rest contact $d_2$ which is connected to the junction of the resistors 13 and 14 connected in series in the energizing circuit of the switching relay B.

In order to change over for a routine test, switches 17 and 18 are connected to the energizing circuits of the auxiliary relays C and D, respectively. The switch 17 serves to switch in the apparatus 5, 6, 7 and the switch 18 serves to switch in the apparatus 1, 2, 3.

Starting from the condition shown in Fig. 1, in which the relays A and C are energized and the energizing windings of the relays D and B are short-circuited, the operation of the arrangement will now be described in detail with reference to the time diagram shown in Fig. 2.

It is assumed that at the instant $t_1$ the switch 17 is closed so that the energizing winding of the auxiliary relay C is short-circuited through the parallel circuit comprising the switch 17 and earth and is released. At the instant $t_2$, at which the auxiliary relay C passes from the working condition to the rest condition, the short-circuiting circuit of the relay winding of the auxiliary relay D, which circuit comprises the make contact $c_1$ and earth, is interrupted, so that the auxiliary relay D is energized through the resistor 16.

When the auxiliary relay C passes from the working condition to the rest condition, the switching relay A remains energized until at the instant $t_3$, the rest condition is reached, so that the energizing winding of the switching relay A is short-circuited through the circuit comprising the rest contact $c_2$ and earth, and consequently this switching relay A is released only after the auxiliary relay D controlling the switching relay B has been energized. Thus, the switching relay A passes from the working condition to the rest condition at the instant $t_4$, so that, when the rest condition has been reached ($t_5$), the output circuit of the carrier-wave amplifier 2 is connected to the load simulating impedance 8 through the transformer 3.

The auxiliary relay D, which at the instant $t_2$ is already energized through the resistor 16, on reaching the working condition ($t_6$) short-circuits the auxiliary relay C through the circuit comprising the make contact $d_1$ and earth. At the instant $t_8$, at which the auxiliary relay D passes from the rest condition to the working condition, the short-circuiting circuit of the switching relay B comprising the rest contact $d_2$ and earth is broken, so that this relay B is energized and at the instant $t_7$ connects the output circuit of the carrier-wave amplifier 6 to the output impedance 4 of the carrier-wave supply source.

Thus, the change-over is completed, so that the apparatus 5, 6, 7 is the operative apparatus and the apparatus 1, 2, 3 acts as the reserve. The carrier-wave oscillator 1 and the associated carrier-wave amplifier 2 can now be tested for a routine test.

If one wants to switch back, from this condition, to the apparatus 1, 2, 3, the energizing winding of the auxiliary relay D is short-circuited by means of the switch 18, the change-over being effected in a manner similar to that described hereinbefore.

When the switch 18 is closed, the auxiliary relay D is released, so that at the instant at which it passes from the working condition to the rest condition, the circuit short-circuiting the energizing winding of the auxiliary relay C is broken, the energizing winding of the switching relay B being short-circuited on the rest condition being reached.

The auxiliary relay C is energized and, in passing from the rest condition to the working condition, breaks the circuit short-circuiting the switching relay A, the energizing winding of the auxiliary relay D being short-circuited when the working condition is reached. Owing to the release of the switching relay B, the carrier-wave amplifier 6 is connected to the load simulating impedance 12, whereas owing to the switching relay A being energized, the carrier-wave amplifier 2 is connected to the output impedance 4 of the carrier-wave supply source, so that the original condition is restored.

In Fig. 2, the interruption period occurring in changing over, which period is equal to the time difference between the instant at which the switching relay B reaches the working condition and the instant at which the switching relay A passes from the working condition to the rest condition is shown by the time distance $t_7—t_4$. Owing to the fact that there is a time delay between the energization of the auxiliary relay D and the release of the switching relay A and by a suitable adjustment of the response times with respect to the release times of the switching relays A and B, a minimum interruption period is achieved. In the embodiment shown, this adjustment is effected in a very simple manner, i.e. the release time of the switching relays A and B are adjusted with the aid of resistors 10 and 14 included in the short-circuiting circuit, respectively, the response times being adjusted by means of resistors 9 and 13 connected in series with the resistors 10 and 14, respectively. In the embodiment shown, for example, in which the switching relays A and B are of the type SZC 6300/001/Aa and the values of the resistors 9 and 13 are $27k\Omega$ and of the resistors 10 and 14 are 8, $2k\Omega$, an interruption period of 0.25 msec. has been achieved. The interruption period may even be reduced to zero.

In order to switch in automatically the reserve apparatus on the occurrence of a fault in the operating apparatus, the arrangement shown is also provided with supervisory relays E and F. These supervisory relays have make contacts $e_1$ and $f_1$, respectively, connected in the energizing circuits of the auxiliary relays C and D, respectively and rest contacts $e_2$ and $f_2$ connected to alarm devices 23 and 24, respectively, the energizing windings of these supervisory relays E and F being fed with the output voltages of the carrier-wave amplifiers 2 and 6 through coupling coils 19 and 20 and rectifier cells 21 and 22, respectively.

If, for example, the output voltage of the carrier-wave amplifier 2, which at this instant acts as the operative apparatus, falls off, the supervisory relay E is released. The energizing circuit of the auxiliary relay C is broken and the change-over device switches in the reserve apparatus 5, 6, 7 in the manner described hereinbefore, the alarm device 23 being actuated by the closure of the rest contact $e_2$.

When the fault has been rectified, the supervisory relay E responds and the make contact $e_1$ is closed, however, no change-over is effected. The fact that the auxiliary relays C and D cut off one another, prevents the change-over arrangement from being repeatedly changed over.

If a fault occurs when the carrier-wave oscillator 5, the carrier-wave amplifier 6 and the output transformer act as the operative apparatus, the supervisory relay F switches in the acting reserve apparatus 1, 2, 3 in like manner.

In a practical embodiment of the system shown in Fig. 1, the supervisory relays E and F, the auxiliary relays C and D, the switching relays A and B, respectively, and the associated elements of the carrier-wave oscillators 1 and 5 and carrier-wave amplifiers 2 and 6, respectively, are united to form structural units.

What is claimed is:

1. In a signal transmission system having an operative signal apparatus, a reserve signal apparatus and a load circuit, change-over switching arrangement comprising a first switching relay connected to selectively connect said operative signal apparatus to said load circuit, a second switching relay connected to selectively connect said reserve signal apparatus to said load circuit, a first auxiliary relay having a rest contact connected to selectively de-energize said first switching relay, a second auxiliary relay having a rest contact connected to selectively de-energize said second switching relay, said first auxiliary relay having a make contact connected to selectively de-energize said second auxiliary relay, said second auxiliary relay having a make contact connected to selectively de-energize said first auxiliary relay, and first and second switches connected to selectively de-energize said first and second auxiliary relays, respectively.

2. A system as claimed in claim 1, including a source of relay energizing current, a first tapped resistance network connected between said current source and said first switching relay, means connecting said rest contact of the first auxiliary relay to the tap on said first resistance network, a second tapped resistance network connected between said current source and said second switching relay, and means connecting said rest contact of the second auxiliary relay to the tap on said second resistance network.

3. A system as claimed in claim 1, in which each auxiliary relay comprises an energizing winding, and in which said first and second switches are connected to selectively short-circuit the energizing windings of said first and second auxiliary relays, respectively.

4. A system as claimed in claim 1, in which each auxiliary relay comprises an energizing winding, and in which said first and second switches are connected in series with the energizing windings of said first and second auxiliary relays, respectively.

5. A system as claimed in claim 1, including a first supervisory relay connected to be actuated by signals from said operative signal apparatus and adapted to actuate said first switch in the event of the absence of signals from said operative signal apparatus, and a second supervisory relay connected to be actuated by signals from said reserve signal apparatus and adapted to actuate said second switch in the event of the absence of signals from said reserve signal apparatus.

References Cited in the file of this patent

UNITED STATES PATENTS

| | | |
|---|---|---|
| 2,410,678 | Parkhurst | Nov. 5, 1946 |
| 2,663,010 | Brundage | Dec. 15, 1953 |